United States Patent
Vijayan et al.

(10) Patent No.: US 9,460,405 B2
(45) Date of Patent: Oct. 4, 2016

(54) SYSTEMS AND METHODS FOR CLOUD DATA LOSS PREVENTION INTEGRATION

(71) Applicant: PayPal, Inc., San Jose, CA (US)

(72) Inventors: Sachin Vijayan, San Jose, CA (US); Chirag Shah, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/138,050

(22) Filed: Dec. 21, 2013

(65) Prior Publication Data

US 2015/0100357 A1 Apr. 9, 2015

Related U.S. Application Data

(60) Provisional application No. 61/886,430, filed on Oct. 3, 2013.

(51) Int. Cl.
*G06Q 10/06* (2012.01)
*H04L 29/08* (2006.01)
*H04L 29/06* (2006.01)

(52) U.S. Cl.
CPC ........... *G06Q 10/0631* (2013.01); *H04L 63/20* (2013.01); *H04L 67/14* (2013.01); *H04L 67/06* (2013.01)

(58) Field of Classification Search
CPC ........ G06F 21/00; G06F 21/10; G06F 21/60; G06F 21/62; G06F 21/64; G06F 21/70; H04L 63/20; H04L 41/08; H04L 41/0806
USPC ....... 709/203, 217, 218, 219, 220, 224, 226; 717/110, 140, 169, 177; 726/1, 3, 4, 726/26, 27, 30
See application file for complete search history.

(56) References Cited

U.S. PATENT DOCUMENTS

| | | | |
|---|---|---|---|
| 7,738,383 B2* | 6/2010 | Wing | H04L 41/12 370/236 |
| 8,321,560 B1 | 11/2012 | Pai et al. | |
| 8,495,611 B2* | 7/2013 | McCarthy et al. | 717/169 |
| 9,026,644 B2* | 5/2015 | Parker | H04L 43/00 709/224 |
| 2011/0022642 A1* | 1/2011 | deMilo et al. | 707/805 |

(Continued)

OTHER PUBLICATIONS

"International Application Serial No. PCT/US2014/059181, International Search Report mailed Jan. 13, 2015".

(Continued)

*Primary Examiner* — Saket K Daftuar
(74) *Attorney, Agent, or Firm* — Maschoff Brennan (57) ABSTRACT

A system, method, and computer readable medium is provided to provide an integrated storage system. For example, an embodiment may detect, by an enterprise computer system, an activity notification from a cloud service that stores data on behalf of an enterprise. The activity notification may specify a file name involved in an activity performed by the cloud service (e.g., creating or modifying a file). The enterprise computer system may then download a file (or contents thereof) from the cloud service using the file name specified by the activity notification. After downloading the file, the enterprise computer system may analyze the file against a data loss prevention rule. Based on an outcome from the data loss prevention rule, the enterprise computer system may communicate an action response to the cloud service. The action response may direct the cloud service to perform an action on the file stored by the cloud service.

17 Claims, 6 Drawing Sheets

(56) References Cited

U.S. PATENT DOCUMENTS

| | | | |
|---|---|---|---|
| 2012/0066670 A1* | 3/2012 | McCarthy et al. | 717/169 |
| 2012/0233311 A1* | 9/2012 | Parker | H04L 43/00 709/224 |
| 2012/0240183 A1 | 9/2012 | Sinha | |
| 2012/0252405 A1* | 10/2012 | Lortz et al. | 455/410 |
| 2012/0304244 A1* | 11/2012 | Xie et al. | 726/1 |
| 2012/0324578 A1* | 12/2012 | Seinfeld et al. | 726/24 |
| 2013/0227670 A1* | 8/2013 | Ahmad et al. | 726/11 |
| 2013/0227683 A1 | 8/2013 | Bettini et al. | |
| 2013/0246431 A1 | 9/2013 | Ahuja et al. | |
| 2013/0282798 A1* | 10/2013 | McCarthy et al. | 709/203 |
| 2013/0298198 A1* | 11/2013 | Lord et al. | 726/4 |
| 2014/0006060 A1* | 1/2014 | Sehnal et al. | 705/4 |
| 2014/0026181 A1* | 1/2014 | Kiang et al. | 726/1 |
| 2014/0026182 A1* | 1/2014 | Pearl et al. | 726/1 |
| 2014/0245085 A1* | 8/2014 | Halverson | G06F 11/0766 714/57 |

OTHER PUBLICATIONS

"International Application Serial No. PCT/US2014/059181, Written Opinion mailed Jan. 13, 2015".

* cited by examiner

SYSTEMS AND METHODS FOR CLOUD DATA LOSS PREVENTION INTEGRATION

RELATED APPLICATIONS

This application claims the benefit of U.S. Provisional Application No. 61/886,430, filed Oct. 3, 2013, entitled "Cloud Data Loss Prevention Integration," which is herein incorporated by reference in its entirety.

TECHNICAL FIELD

This application relates to data processing. In particular, example embodiments may relate to systems and methods for integrating a cloud service with information systems of an enterprise.

BACKGROUND

Traditional cloud service providers may provide a cloud service to a user, such as an enterprise, for storing data on computer resources hosted by the cloud service provider. In this way, a company's data is stored by and accessible from multiple distributed and connected resources that comprise a cloud. Cloud storage can provide the benefits of: greater accessibility and reliability; rapid deployment; strong protection for data backup, archival, and disaster recovery purposes; and lower overall storage costs as a result of not having to purchase, manage, and maintain expensive hardware.

There are three traditional types of cloud storage systems. The first type of cloud storage system may be referred to as public cloud storage. In public cloud storage, an enterprise and a storage service provider are separate entities. The computational resources used to store data are managed by the storage service provider and are not part of the enterprise's data center. Thus, the cloud storage provider fully manages the computational resources used to manage the enterprise's data stored within the cloud storage system.

The second type of cloud storage system may be referred to as private cloud storage. In private cloud storage, the enterprise and cloud storage provider are integrated within the enterprise's data center. This may mean that the storage provider has infrastructure within the enterprise's data center. Private cloud storage helps resolve the potential for security and performance concerns while still offering the advantages of cloud storage.

The third type of cloud storage system may be referred to as hybrid cloud storage. In hybrid cloud storage, some critical data resides in the enterprise's private cloud while other data is stored and accessible from a public cloud storage provider. Thus, hybrid cloud storage systems may be some combination of public and private cloud storage systems.

Currently, enterprises adopting a cloud strategy for their storage systems generally adopt one or more of these three types of cloud storage systems depending on the needs of the enterprise.

BRIEF DESCRIPTION OF THE DRAWINGS

The present invention is illustrated by way of example, and not by way of limitation, in the figures of the accompanying drawings in which.

DETAILED DESCRIPTION

Although example embodiments have been described with reference to specific examples, it is to be appreciated that various modifications and changes may be made to these embodiments without departing from the broader spirit and scope of the invention. Accordingly, the specification and drawings are to be regarded in an illustrative rather than a restrictive sense.

Example embodiments may relate to integrating a data loss prevention ("DLP") policy (or policies) of an enterprise with data stored on a cloud service. As is discussed below, a DLP policy may be a process that identifies confidential data (e.g., credit card numbers, social security numbers, and the like), tracks that data as it moves through and out of enterprise, or prevents unauthorized disclosure of data by creating and enforcing disclosure policies. However, in some cases, an enterprise, or employees thereof, may store data in a cloud service, such as Box.com®. Example embodiments may then relate to an enforcing a DLP policy where data is stored outside the enterprise by a cloud service.

For example, an example embodiment may detect, by an enterprise computer system, an activity notification from a cloud service that stores data on behalf of an enterprise. The activity notification may specify a file name involved in an activity performed by the cloud service (e.g., creating or modifying a file). The enterprise computer system may then download a file (or contents thereof) from the cloud service using the file name specified by the activity notification. After downloading the file, the enterprise computer system may analyze the file against a data loss prevention rule. Based on an outcome from the data loss prevention rule, the enterprise computer system may communicate an action response to the cloud service. The action response directing the cloud service to perform an action on the file stored by the cloud service.

Accordingly, an example embodiment may use an event-driven system, where the cloud service initiates a DLP process by notifying the enterprise computer systems when an activity is performed on a file of the enterprise but stored by the cloud service. In other example embodiments, discussed in greater detail below, the computer systems of an enterprise may initiate a process of analyzing a file against one or more DLP rules. An enterprise may initiate the process of analyzing a file against one or more DLP rules to perform on-demand scans of a user share.

These and other embodiments are now described by way of example and not limitation.

System Overview of an Event-Based Integrated Storage System

Figure 1:
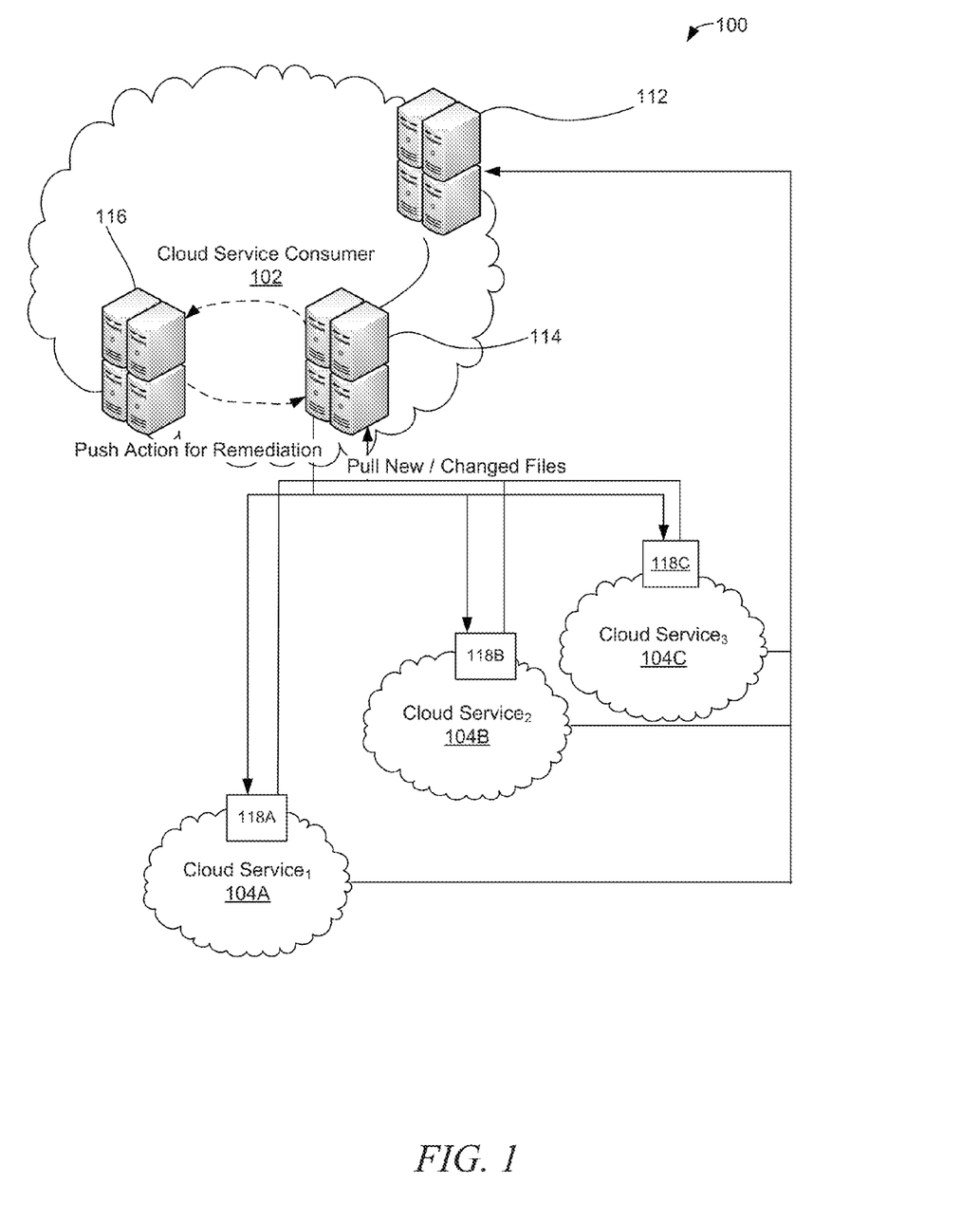
FIG. 1 is a system diagram depicting an integrated storage system, according to one embodiment.

FIG. 1 is a system diagram depicting an integrated storage system 100, according to one embodiment, wherein an enterprise 102 is integrated with one or more cloud services, such as any combination of cloud services 104A-C.

The enterprise 102 may be a computer system operated by an entity (e.g., a business, organization, company, person, or any other suitable entity) that manages, processes, stores, or communicates data. To fulfill its data storage needs, in full or in part, the enterprise 102 may be communicatively coupled to one or more of the cloud services 104A-C.

The cloud services 104A-C may provide cloud storage services to users (e.g., employees, departments, teams, etc.) of the enterprise. Accordingly, the cloud services 104A-C may provide cloud services where data "owned" by the enterprise is stored, at least partially, on computational resources managed by the cloud services 104A-C. Examples of providers of cloud services for storing data include BOX.COM®, SKYDRIVE®, YAMMER®, SALESFORCE®, and DROPBOX®, to name a few.

In addition to general storage needs, the enterprise 102 may deploy a data loss prevention policy to address data loss concerns. DLP, as used herein, is broadly defined as any solution or process that identifies confidential data, tracks that data as it moves through and out of the computer systems of the enterprise 102, or prevents unauthorized disclosure of data by creating and enforcing disclosure policies. In some embodiments, DLP may involve an on-demand or a schedule-based solution that scans data at data storage locations to identify confidential data that may be stored at those data storage locations and, if so configured, to take appropriate remedial action. Examples of confidential data may include social security numbers, financial data (e.g., credit card number, magnetic stripe data, and the like), username and password pairs, proprietary information, licensed data (e.g., copyrighted works), or any other data that may compromise the enterprise if the data is misappropriated.

With respect to FIG. 1, DLP may be provided for the enterprise 102 through an integration of components or modules of the enterprise 102 and the cloud services 104A-C. For example, as shown in FIG. 1, the enterprise 102 may include a job scheduler 112, a DLP backend server 114, and a DLP engine 116, while the cloud services 104A-C may each include a notification port. See, for example, notification ports 118A-C.

The job scheduler 112 may be a computer-implemented module configured to serve as a listener service for the cloud services 104A-C to contact and issue "notifications" concerning data (e.g., file) uploads and modifications and, responsive to receiving a notification, the job scheduler 112 may add a job corresponding to the activity notification in a job queue. To receive the notifications issued by the cloud services 104A-C, the job scheduler 112 may provide an API based on industry standard application programming interface ("API") types and common protocols, such as Hypertext Transfer Protocol ("HTTP")/HTTP Secure ("HTTPS"), Representational State Transfer ("REST"), Simple Object Access Protocol ("SOAP"), etc. In some cases the notifications sent from the cloud services 104A-C may be protected via a secure communication protocol such as Secure Socket Layer ("SSL")/Transport Layer Security ("TLS"). Accordingly, the job scheduler 112 may be configured to communicate using these secure communication protocols. Further, the job scheduler 112 may be configured to enforce authentication/authorization requirements at the API level through support of industry standards like OAuth, SSL/TLS, Security Assertion Markup Language ("SAML").

The DLP backend server 114 may be a computer-implemented module configured to process jobs from the job scheduler 112 and then communicate an action response to the cloud service. For example, as part of processing a job from the job scheduler, the DLP backend server 114 may identify a file corresponding to the job, obtain the identified file from the cloud service, and communicate the file to the DLP engine 116 for DLP analysis. After the DLP engine 116 completes DLP analysis, the DLP backend server 114 may communicate an action response back to the cloud service. The action response may direct the cloud service to perform a specified action on the file stored in the cloud service.

The DLP engine 116 may be a computer-implemented module configured to verify files against one or more DLP rules. A DLP rule may be data and/or logic that specify conditions when a file violates a DLP policy of the enterprise. The DLP rule may also specify an action that is to be performed by the cloud service in response to a detected violation of one or more DLP rules. By way of example and not limitation, such actions may include removing the file from the cloud service, messaging the enterprise user concerning the violation, removing any backup or revisions of the file which may be in violation, or any other suitable operation involving the file or the enterprise user.

With respect to the cloud services 104A-C, the notification ports 118A-C may each be computer-implemented modules configured to communicate activity notifications to the job scheduler 112 and receive notification responses from the backend server 114. For example, the cloud service 104A may be configured to communicate, via the notification port 118A, an activity notification to the job scheduler 112 whenever a file belonging to the enterprise is created or modified in the cloud storage service offered by the cloud service 102A. An activity notification may be a data message that includes any number of the following fields:

Cloud Service ID: This field identifies the provider that is sending the notification and identifies the return destination for the notification response. In some cases, the cloud service ID may be represented as a uniform resource locator, a unique code, or any other suitable data capable of uniquely identifying the various cloud services. By way of example and not limitation, the cloud service ID may specify https://dropbox.com, https://app.box.com, or any other identifier associated with a cloud service provider. In addition to specifying a uniform resource locator ("URL") associated with the cloud service provider, the cloud service ID may further include an identifier assigned to the notification port 118A, such as a port number.

File ID: This field identifies a file identifier for the file in which the activity notification is being generated. For example, if an enterprise user creates a file with the identifier "Foo.doc," the file ID field may specify "Foo.doc." It is to be appreciated that the file identifier specified by the file ID field does not necessarily have to be a file name. In some cases, the file identifier may be a uniquely generated number or code assigned to files maintained by the cloud service provider.

Enterprise User ID: This field identifies the enterprise user that has initiated the activity to the file specified by the file ID field. The enterprise user ID may be the username assigned to the account within the cloud service provider.

File Path: This field specifies information for retrieval of the file for DLP analysis. In some cases, the file path field may include data that specifies a directory structure that can be used to retrieve or otherwise access the file specified by the file ID field.

File Activity: This field identifies the file activity that triggers the notification. Examples of file activities may include an upload of a new file within the cloud storage system, modification of the contents of an existing file, a change of permissions associated with a file, a change of a file name, deleting a file, or any other file operation supported by a filesystem.

Action: This is an optional field that may be blank if included in the activity notification. The purpose of this field may be to provide a field for the enterprise 102 to specify an action for the cloud service provider to perform after DLP analysis. Thus, the action field may be a field that includes data specified by the enterprise 102.

In addition to sending activity notifications to the enterprise 102 (e.g., the job scheduler 112), the notification port 118A may also be configured to receive notification responses communicated by the backend server 114. In some cases, the notification responses may include some or all of the fields specified by the activity notification. For example, the notification response may include one or more fields specifying a cloud service ID, file ID, an enterprise user ID, a file path, a file activity, and an action. The contents or values of these fields may be the values specified by the activity notification to which the notification response corresponds. However, some fields may be updated by the backend server to specifying a remedial action specified by the DLP engine 116. The remedial actions may be specified by the action field of the notification response. As described above, examples of actions may include, but are not limited to, removing the file from the cloud service, messaging the enterprise user concerning the violation, removing any backup or revisions of the file which may be in violation, or any other suitable operation involving the file or the enterprise user.

Example Data Flow for an Event-Based Integrated Storage System

Figure 2:
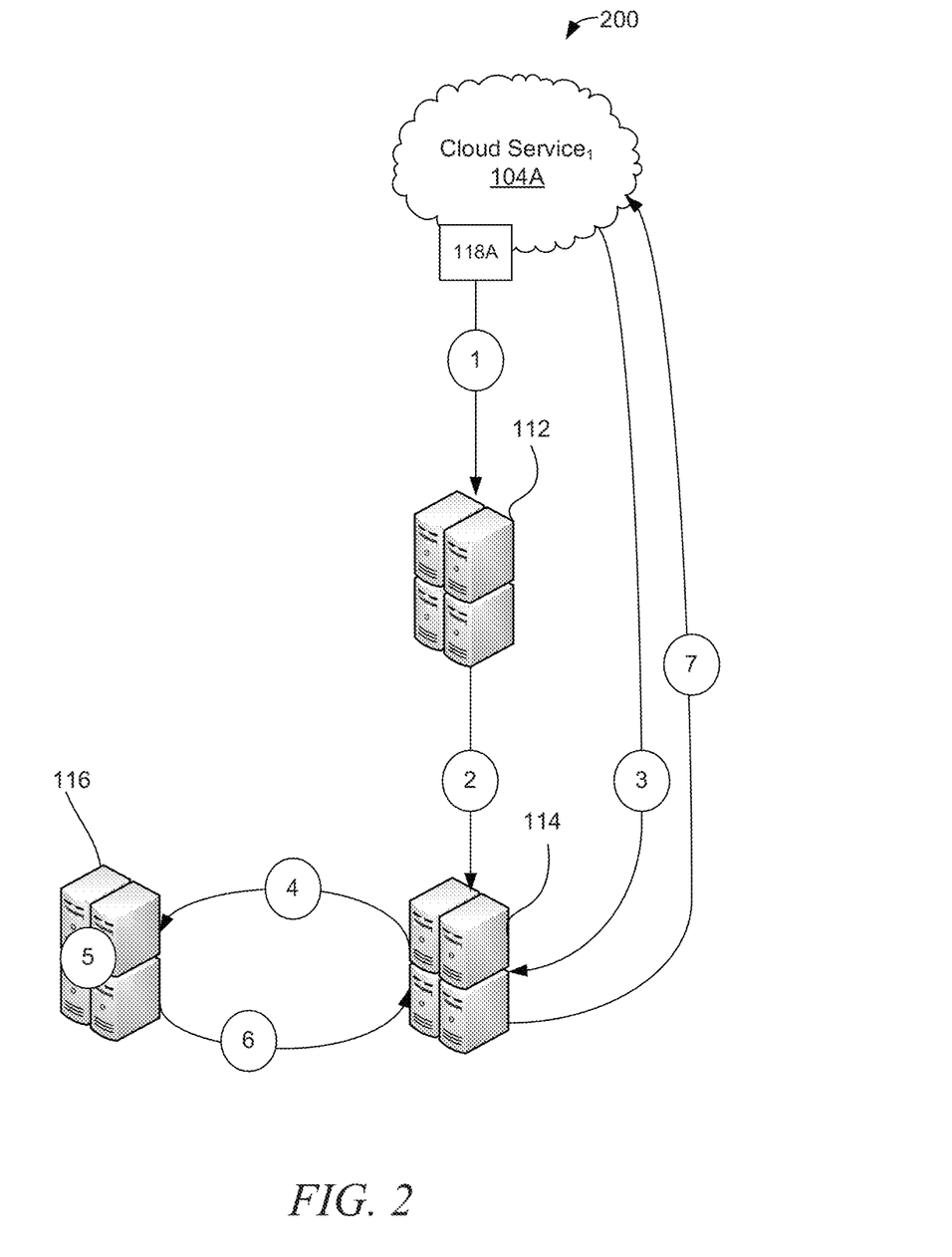
FIG. 2 is a data flow diagram of the integrated storage system of FIG. 1, according to an example embodiment.

FIG. 2 is a data flow diagram of the integrated storage system 100 of FIG. 1, according to an example embodiment. In some embodiments, the data flow is implemented by one or more processors, as may be executed by one or more of the modules or components shown in FIG. 1. Accordingly, FIG. 2 is described with reference thereto.

At step 1, the cloud service 104A pushes an activity notification to the job scheduler 112. The activity notification may include fields that include data that indicate that a file maintained by the cloud service 104A has been uploaded or changed by an enterprise user. As described above, the notification may include, among other things, data fields that specify a cloud service identifier, a file identifier, an enterprise user identifier, a file path, or a file activity. It is to be appreciated that the activity notification may include data that is standardized between the cloud consumer 102 and one or more of the cloud services 104A-C. Further, this notification may be communicated in a trusted and secure manner, utilizing, for example, SSL certificates.

As part of step 1, the job scheduler 112 verifies and queues the activity notification, in the form of a job, to be retrieved by the backend server 114. As described above, the activity notification, and in turn, the job, includes all the basic detail required to retrieve the file from the cloud service 104a. It is to be appreciated that the terms job and activity notification may, in some embodiments, refer to the same data object, while, in other embodiments, these terms may refer to different data objects where a job is a data type with one or more data fields that derive values from a corresponding activity notification.

At step 2, backend server 114 pulls the job from the job scheduler 112 and, at step 3, the back end server 114 connects to cloud service 104A to obtain (e.g., by pulling or downloading) the file from cloud service 104a. In some cases, the backend server 114 may pull the file using the data fields specified by the activity notification (e.g., the file ID, the cloud service ID, the file path, and the like). It is to be appreciated that some embodiments may use trusted and secure communication protocols, such as SSL certification, to request and receive the file from the cloud service 104a.

At step 4, the backend server 114 communicates (via, for example, using a communication protocol such as Internet Content Adaptation Protocol ("ICAP")) the file to DLP engine 116 for DLP analysis. In some embodiments, step 4 may further involve the backend server 114 erasing the contents of the file from any storage device that may have been used to temporarily store the file.

At step 5, the DLP engine 116 analyzes the file and the file contents against one or more DLP rules and selects an action response. In some cases, a DLP rule may be data or logic that specifies a condition and a triggered response. If the content of the file and/or metadata of the file matches the condition specified by the DLP rule, then the DLP engine 116 may communicate the action response to the backend server 114. If, however, the file (e.g., the content or metadata thereof) does not match the condition of any of the DLP rules, the DLP engine 116 may select a 'no action' action response.

At step 6, the backend server 114 receives a DLP analysis response from the DLP engine 116 that specifies the selected action response. Responsive to receiving the selected action response, the backend server 114 inserts the selected action response into a notification response to the activity notification previously received at step 1. As described above, a notification response be a data message derived from the activity notification. Accordingly, step 6 may simply involve, among other things, updating the action field of the activity notification with a value corresponding to the selected DLP action.

At step 7, the backend server 114 connects to the cloud service 104A through the notification port 118A and pushes a notification response, which may contain metadata and the action, to the notification port 118a.

At step 8, the cloud service 104a performs a remediation action corresponding to the value of the action field of the notification response. For example, the cloud service 104a may delete the file corresponding to the activity represented by the activity notification.

It is to be appreciated the steps shown in FIG. 2 are illustrative of an example embodiment and should not be interpreted as limiting the scope of other embodiments contemplated by this disclosure. For example, it is to be appreciated that the term "step" should not be interpreted as requiring any particular sequence or order of operation. It is to be appreciated further that FIG. 2 provides specific references to "pushing" and "pulling" operations by way of example and not by way of limitation. Thus, this disclosure contemplates that other embodiments may use other suitable sequences of "pushing" or "pulling" data.

Figure 3:
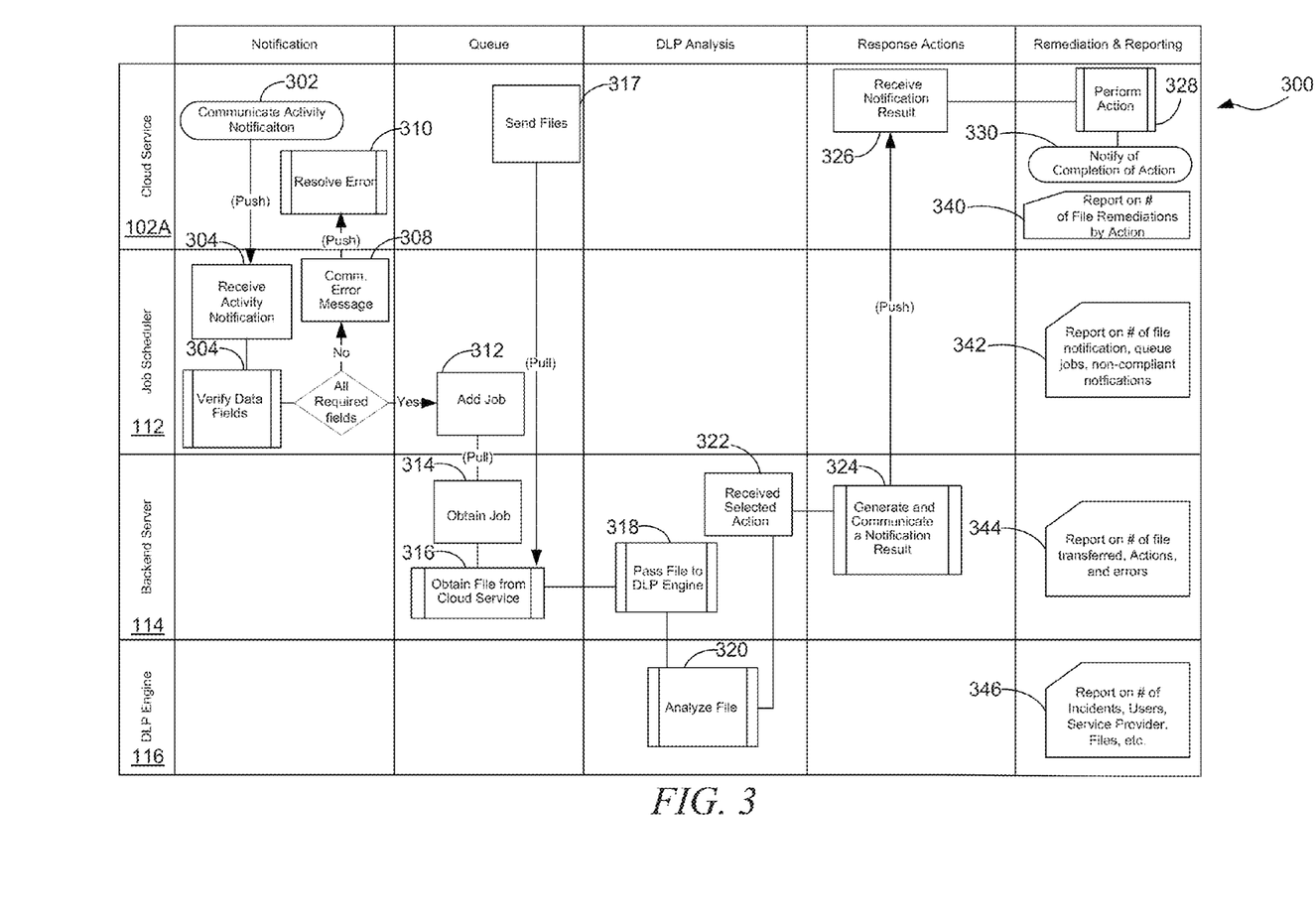
FIG. 3 is a flow chart illustrating a method of providing integrated DLP support, according to an example embodiment.

FIG. 3 is a flow chart illustrating a method 300 of providing integrated DLP support, according to an example embodiment. In some embodiments, the method 300 may characterize the operations shown in FIG. 2 in greater detail.

The method 300 may begin at operation 302 when the cloud service provider 102A communicates an activity notification to the job scheduler 112. The activity notification may represent a file system operation performed by the cloud service 102a with respect to a given file or directory. As described above, in some cases, the activity notification may include data specifying the cloud service provider, a filename corresponding to the activity, a file path, an activity identifier, an enterprise user ID, and the like. As FIG. 3 illustrates, operation 302 pushes the activity notification to the job scheduler 112; however, other embodiments may operate such that the job scheduler 112 pulls the activity notification from the notification port 118A of the cloud service 102A.

At operation 304, the job scheduler 112 may receive the activity notification communicated by the cloud service 102A. Upon receiving the activity notification, the job scheduler 112 may verify that the activity notification was sent from a trusted source. In some embodiments, a trusted source is verified through a certificate used to establish a secure communication (e.g., via SSL/TLS). It is to be appreciated that, in other embodiments, secure tokens that are passed along with the communication can be used for authentication.

At operation 306, the job scheduler 112 may verify the data fields of the activity notification. For example, the job scheduler 112 may verify the data fields of the activity notification by determining whether one or more of the data fields include invalid values. For example, where the activity notification is missing a file name, the job scheduler 112 may signal that one or more data fields from the activity notification are invalid. As another example, if the activity notification includes a directory path in an incorrect format, the job schedule 112 may signal that the directory path is incorrect and, in some cases, may specify an expected format.

If one or more of the data fields from the activity notification are invalid, the job scheduler 112, at operation 308, may communicate an error message to the cloud service 102A. The error message may include a description that identifies which data field is invalid and why that data field is invalid. At operation 310, the cloud service 102A may resolve the error by, for example, entering information missing from the original submission.

Returning back to operation 306, if, on the other hand, the job scheduler 112 determines that the data fields are instead valid, the job scheduler 112 adds, at operation 312, a job representing the activity notification to a job scheduler, or any other suitable data structure that maintains a collection of jobs that are to be processed by the DLP engine 116. The job may have one or more of the data fields specified by the activity notification.

At operation 314, the backend server 114 obtains the job from the job scheduler 112. Then, at operation 316, the backend server 116 may obtain the file involved in the detected activity from the cloud service 102a. In some embodiments, obtaining the file from the cloud service 102 may involve the backend server 114 parsing data from the job and then using the data to access the file through the file system interface exposed by the cloud service 102A. For example, the backend server 114 may communicate a file request to the cloud service 102A, where the file request may include, among other things, a filename, a file path, an enterprise user ID, and the like. Using information from the file request, the cloud service 102A may, at operation 317, send the file (or files) to the backend server 114.

Operation 318 may begin the DLP analysis phase. For example, at operation 318, the backend server 114 may pass the file (or files) to the DLP engine 116 for DLP analysis. Once the DLP engine 116 receives the file (or files), the backend server 114 may delete the file (or files) from storage. Thus, the file (or files) obtained from the backend server 114 from the cloud server 102A are only maintained in memory for a limited time.

Once the DLP engine 116 receives the file (or files) from the backend server 114, the DLP engine 116 may then analyze the file (or files) based on one or more DLP rules. This is shown as operation 320. As described above, an example DLP rule may specify a condition in which a file may violate a policy of the enterprise. A DLP rule may further specify an action that the cloud service 102A is to perform in response to detecting that the file (or files) violates a policy of the enterprise. Example embodiments of DLP rules may include data or logic configured to identify confidential data, such as social security numbers, financial data (e.g., credit card number, magnetic stripe data, and the like), username and password pairs, proprietary information, licensed data (e.g., copyrighted works), or any other data that may compromise the enterprise if the data is misappropriated.

At operation 322, the backend server 114 receives the selected action from the DLP engine 116. In some cases, the selected action may be received in a way that the selected action is mapped back to the job used to analyze the file passed to the DLP engine 116 at operation 318. For example, passing the file to the DLP engine 116 may be a function call that blocks on the result (e.g., the selected action). In other cases, the selected action may be communicated to the backend server 114 with an identifier mapped to the message that sent the file to the DLP engine 116, an identifier mapped to the job corresponding to the file, an identifier mapped to the activity notification, or any other message.

At operation 324, the backend server 114 then generates a notification result that is then communicated to the cloud service 102A. The notification result may include the action selected by the DLP engine 116. The notification result may also include one or more data fields specified by the activity notification, such as data fields that specify a filename, a file path, an enterprise user ID, and the like.

At operation 326, the cloud service 104A receives the notification result from the backend server 114. Then, at operation 328, the cloud service 102A identifies the selected action from the notification result and then performs the selected action on the file that initiated the activity notification. For example, the cloud service 102A may remove the file specified by the notification result or may alert the user of improper activity. In some cases, after the cloud service 102A performs the selected action, the cloud service may notify the enterprise that the selected action was performed. This is shown as operation 330.

As FIG. 3 shows, the cloud service 102A, the job scheduler 112, the backend server 114, and the DLP engine 116 may each generate one or more reports as part of performing the method 300. For example, the cloud service 102A may be configured to generate a cloud service report 340 that tracks and reports on the number of file actions performed, as may be organized according to the type of actions. For example, the cloud service report 340 may include data representing that X number of files were removed, X warnings were generated for a user, and so forth.

The job scheduler 112 may be configured to generate a job scheduler report 342 that tracks and reports on one or more of the number of activity notifications received (possibly over a given time period), number of jobs currently queued, number of jobs processed over a given time period, number of non-compliant notifications, and the like. In some embodiments, the job scheduler 112 may generate the job scheduler report 342 such that the data is organized according to various types of data, such as a cloud service identifier, an enterprise user, a file, a type of non-compliant error in an activity notification, and so forth.

The backend server 114 may be configured to generate a service report 344 that tracks and reports on one or more of the number of file activities, actions generated, and errors. In some embodiments, the backend server 114 may generate the service report 344 such that the data is organized according to user ID, file name, action type, error type, and the like.

The DLP engine 116 may be configured to generate a DLP report that tracks and reports on one or more of the number of incidents, the users, the cloud service provider, files, activity types, and the like.

It is to be appreciated that the method 300 shown in FIG. 3 may be used by some embodiments to enforce DLP policies in a system that utilizes a cloud service to store data files and content. In some cases, some embodiments may perform the method 300 in cases where the enterprise seeks to limit the computer resources used to enforce a DLP policy. Such may be the case because the computer systems of the enterprise are notified when file operations are performed on files that may trigger DLP analysis.

Integrated Storage System for Performing On-Demand Scans

So far, much of this disclosure has focused on an event-based approach where a cloud service sends activity notifications to initiate an enterprise's DLP process for files stored by the cloud service. However, this disclosure further contemplates that, in some cases, an enterprise may initiate the enterprise's DLP process for files stored in a cloud service. For example, some embodiments may operate such that the enterprise initiates the DLP process by mounting the user shares and then running scans on the mounted user shares. In some cases, these scans may be performed on-demand or scheduled to run periodically (e.g., daily, weekly, biweekly, monthly, and so forth). An enterprise driven approach is now described.

Figure 4:
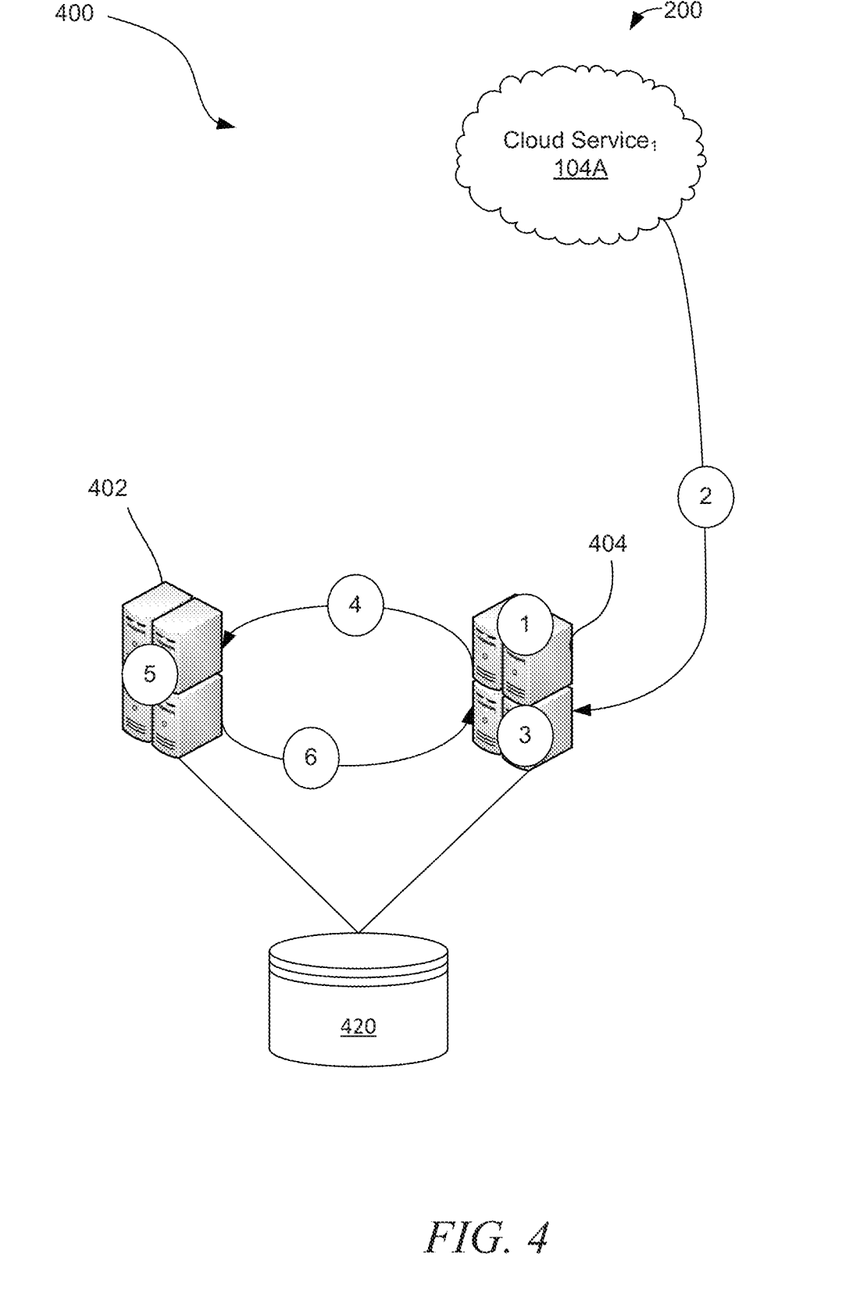
FIG. 4 is a data flow diagram of an integrated storage system for performing on-demand scans of files stored on a cloud service, according to an example embodiment.

FIG. 4 is a data flow diagram of an integrated storage system 400 that implements enterprise driven scans of files stored on a cloud service, according to an example embodiment. As shown in FIG. 4, the integrated storage system 400 may include the cloud service 104A, an enforce server 402 and a DLP discover server 404. The enforce server 402 may be a computer-implemented module configured to provide an interface for creating, modifying, and otherwise managing discovery scan tasks. The DLP discover server 404 may be a module configured to execute and report on the results of the discovery scan tasks. The enforce server 402 and the DLP discover server 404 may form part of the computer systems of the enterprise 102 of FIG. 1.

At step 1, the enforce server 402 facilitates the customization of existing discover scan tasks or development of new discover scans tasks. For example, the enforce server 402 may provide one or more user interfaces ("UIs") for a DLP administrator to: add a user share to a list of user shares, define or otherwise select DLP rules to run as part of the discover scan, view incident reports, schedule or request a discover scan, and the like.

At step 2, the enforce server 402 deploys discover scan tasks to the appropriate DLP discover server 404 for execution of the discover scan tasks. In some cases, the enterprise may include multiple DLP discover servers that are configured to distribute and load balance the discover scan tasks executed by the integrated storage system 400.

At step 3, the DLP discover server 404 mounts a first user share in the discover scan task. Mounting the first user share makes the user share accessible through the file system of the operating system executing on the DLP discover server 404. In some cases, the DLP discover server 404 may mount the user share using WebDAV functionality exposed by the cloud service 104A. WebDAV, short for Web-based Distributed Authoring and Versioning, is an Internet Engineering Task Force ("IETF") standard set of platform-independent extensions to HTTP that allows users to collaboratively edit and manage files on remote web servers. WebDAV features Extensible Markup Language ("XML") properties on metadata, locking—which prevents authors from overwriting each other's changes—namespace manipulation and remote file management.

At step 4, after the DLP discover server 404 mounts the user share, the DLP discover server 404 pulls files from the user share on the cloud service 104A and inspects the files against configured policies and rules to generate an incidents report, as appropriate.

At step 5, after inspecting the files against the configured policies and rules, the DLP discover server 404 unmounts the user share then loops back to step 1 to mount the next share in the list. In some embodiments, the DLP discover server 404 performs one or more tests to verify that the old user share has successfully unmounted before attempting to mount the next share in the list.

At step 6, as incidents are detected by the DLP discover server 404 they are sent to an incidents database 420 and are viewable from the enforce server 402 for incidents review and remediation as necessary.

Figure 5:
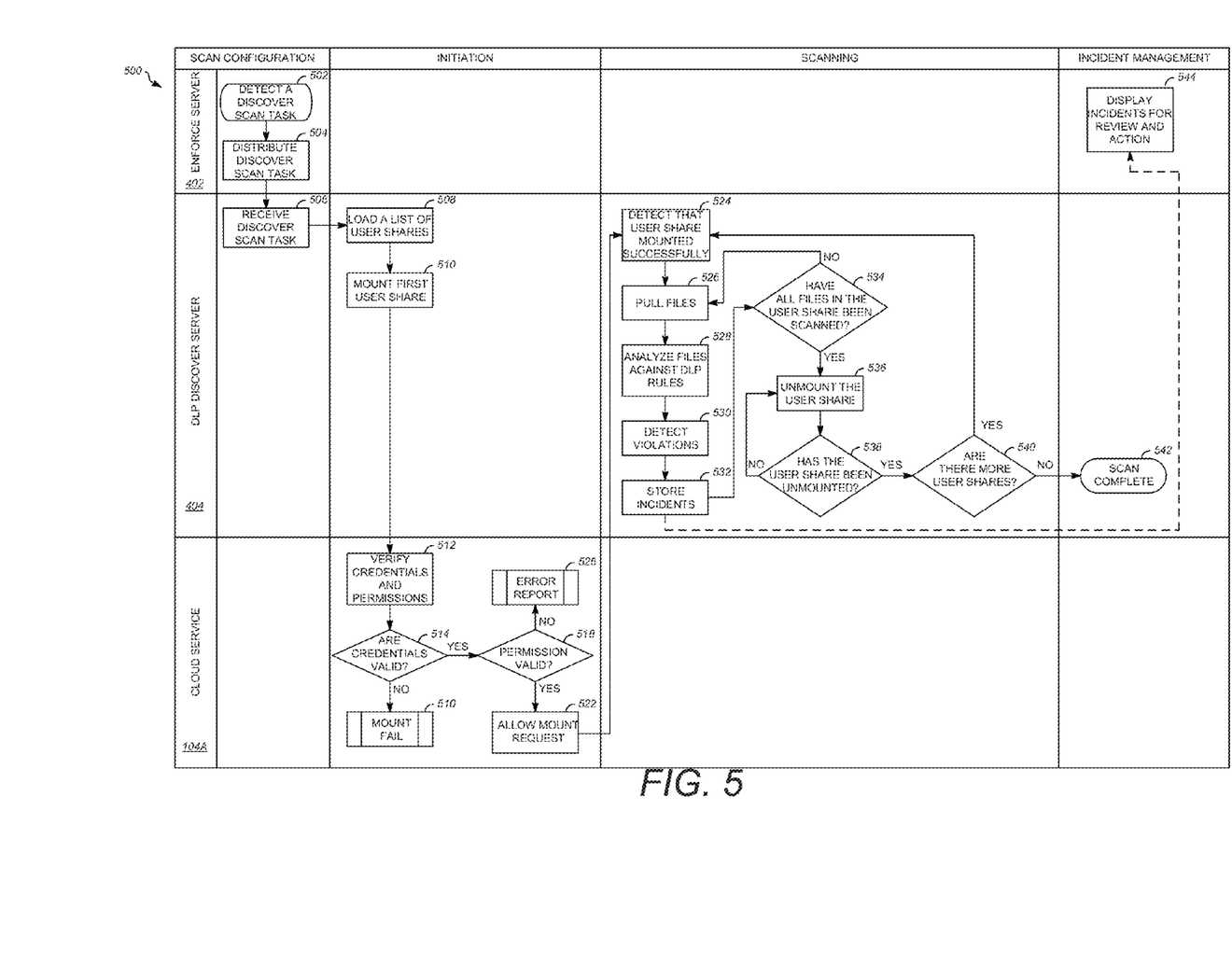
FIG. 5 is a flow chart showing a method for performing on-demand scans, according to an example embodiment.

FIG. 5 is a flow chart showing a method 500 for performing on-demand scans, according to an example embodiment. As FIG. 5 shows, the operations of the method 500 may be performed by the enforce server 402, the DLP discovery server 404, and the cloud service 104A. In some embodiments, the method 500 may characterize the operations shown in FIG. 4 in greater detail.

The method 500 may begin at operation 502 when the enforce server 402 detects that a discover scan task is scheduled to execute. For example, a DLP administrator may have created a discover scan task to scan a user share stored within the cloud service 104A. In some cases, the discover scan task may be associated with a start time. Thus, as part of operation 502, the enforce server 402 may compare a clock to the specified start time for the discover scan task to detect that the discover scan task is scheduled to execute. In other cases, the DLP administrator may merely request, on-demand, that the discover scan task be executed. Thus, as part of operation 502, the enforce server 402 may receive a request to run a discover scan task to detect that a discover scan task is scheduled to execute.

Responsive to detecting that the discover scan task is scheduled to execute, the enforce server 402 may, at operation 504, distribute the discover scan task to the DLP discover server 404. In some cases, the discover scan task may be communicated through the internal network of the enterprise.

At operation 506, the DLP discover server 404 receives the discover scan task. The DLP discover server 404 may queue the discover scan task using any number of data structures and scheduling algorithms. For clarity of description, the discover scan task may be queued in first-in-first-out queue. In other cases, the discover scan task may be queued using a priority weighting scheduling algorithm.

At operation 508, the DLP discover server 404 may initialize the discover scan task by loading the list of user shares to scan. Loading the list of user shares may involve the DLP discover server 404 parsing the discover scan task to identify the user shares to be scanned as part of executing the discover scan task.

At operation 510, the DLP discover server 404 may send a mount request to the cloud service 104A to request that a first user share listed in the discover scan task be mounted. In some embodiments, sending the mount request to the cloud service 104A may involve the DLP discover server 404 parsing the discover scan task to identify the first user share task. The user share task may include data fields specifying authorization/authentication credentials, a cloud service identifier, a user share identifier, and the like. From the data fields specified by the first user share task, the DLP discover server 404 may generate a WebDAV call to mount the user share, where the WebDAV call to mount the user share may include one or more fields specified by the first user share task, such as the credentials. The WebDAV call may then be communicated to the cloud service corresponding to the cloud service identifier of the first user scan task.

For the purpose of description, and not limitation, an example of the mount request sent to the cloud service 104A may be expressed using the following or similar mount command: mount.davfs-uid=userID https://cloudserviceID-.com localDir. 'mount.davfs' may be an operating system command to mount a user share on a local filesystem used by the operating system of the DLP discover server 404. 'uid=userID' may be a name value pair that specifies the user of the user share. The 'userID' portion of the name value pair may be specified in the user share task in a userID field. 'https://cloudserviceID.com' may be a parameter of the mount request that identifies the cloud service (e.g., https://cloudserviceID.com). 'localDir' may be a parameter that specifies the mountpoint where the WebDAV resource is mounted on. localDir may be represented as an absolute or relative path.

Upon receiving the mount request, the cloud service 104A may verify the credentials and the permissions of the user, as may be sent in the mount command. This is shown as operation 512. At decision 514, the cloud service 104A may determine whether the credentials are valid. If not, the cloud service 104A may, at operation 516, notify the mount command failed. Otherwise, the cloud service 104A performs decision 518 and determines whether the user has permission to access the user share. If the user does not have access permission to the user share, the cloud service 104A may notify the DLP discover server 404 that there was an error in the permission sent via the mount command. This is shown as operation 520. If, on the other hand, the user does have permission to access the user share, the cloud service 104A may, at operation 522, allow the DLP discover server 404 to mount the user share in the local filesystem of the DLP discover server 404.

The DLP discover server 404 may then begin scanning the user share at operation 524 when the DLP mounts the user share. Operation 524 may involve the DLP discover server 404 receiving an indication that the mount command completed successfully.

Once the DLP discover server 404 successfully mounts the user share in the local filesystem of the DLP discover server 404, the DLP discover server 404, at operation 526, pulls the files stored in the user share of the cloud service 104A. Pulling the files stored in the user share of the cloud service 104A may involve the DLP discover server 404 issuing filesystem commands to identify files and to read the contents of the identified files.

At operation 528, the DLP discover server 404 may analyze the files obtained from the user share against the DLP rules. In some cases, the user share task or the discover scan task may include one or more data fields specifying the DLP rules that are to be used in the scan. In such cases, the DLP rules may be limited to those specified by the user share task or the discover scan task. In some embodiments, the DLP discover server 404 may select the DLP rules that are to be run in the scan. For example, the DLP discover server 404 may maintain a collect of DLP rules that are run against all files analyzed at operation 528.

Based on the analysis of the files of the user share against the DLP rules, the DLP discover server 404 may detect one or more violations. This is shown as operation 530. Also part of operation 530, the DLP discover server 404 may generate incidents. Incidents may be records that characterize a violation of a DLP rule. Such incidents may specify the user (e.g., user identifier), the file name, the cloud service (e.g., a cloud service identifier), a directory to the file, data representing the violation, a time stamp, an identifier associated with the user share task or the discover scan task. The incidents are stored in the incident database 420 at operation 532.

At decision 534, the DLP discover server 404 determines whether all the files in the user share selected at operation 510 have been scanned. If yes, the DLP discover server 404, at operation 534, unmounts the user share; otherwise, the DLP discover server 404 continues the method 500 by executing operation 526 and subsequent operations again.

After unmounting the user share at operation 536, the DLP discover server 404 determines, at decision 538, whether the user share has been successfully unmounted from the local filesystem. If the user share has not be successfully unmounted from the local filesystem, the DLP discover server 404 may continue the method 500 at operation 536; otherwise, the DLP discover server 404 may determine, at decision 540, whether there are more user shares that are to be scanned, as may be indicated in the discover scan task. If the DLP discover server 404 determines that there are no more user shares to be scanned, the DLP discover server signals that the scan is complete. This is shown as operation 542. Signaling that the scan is complete may involve the DLP discover server 404 sending a message to the enforce server 402 that the scan is complete. The message may indicate that the scan completed successfully or with incidents. If the DLP discover server 404 determines that there are more user shares to be scanned, the DLP discover server 404 may continue the method 500 at operation 524.

As FIG. 5 shows, at operation 544, the enforce server 402 may generate an incident report that summarizes the incidents detected during the execution of the discover scan task. For example, in some cases, the incident report may include data found or otherwise derived from the incident records stored in the incident database. The incident report may organize data found in the incident records based on a user identifier, an incident type, a file name, directory, remedial action, and the like.

It is to be appreciated that the method 500 shown in FIG. 5 may be used by some embodiments to enforce DLP policies in a system that utilizes a cloud service to store data files and content. In some cases, some embodiments may perform the method 500 in cases where the enterprise seeks to limit the DLP functionality needed by the cloud service to support the enforcement of the enterprise's DLP policy. For example, in some cases, the enterprise system may use WebDAV functions to mount the user share, download the files, and then perform scans on the downloaded files.

Exemplary Computer Systems

Figure 6:
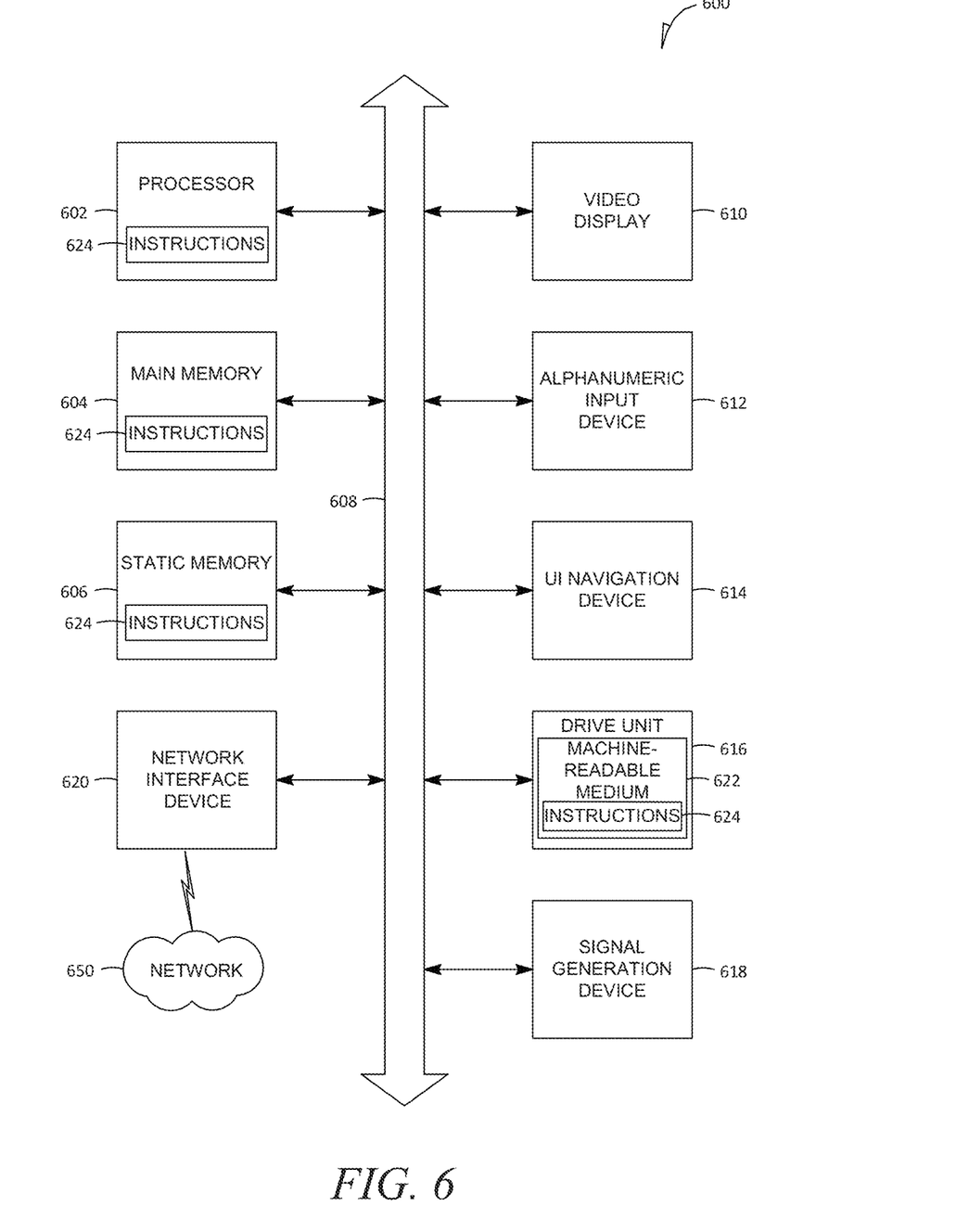
FIG. 6 shows a diagrammatic representation of machine in the example form of a computer system within which a set of instructions may be executed causing the machine to perform any one or more of the methodologies discussed herein.

FIG. 6 shows a diagrammatic representation of machine in the example form of a computer system 600 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in example embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Furthermore, the following claims are hereby incorporated into the Detailed Description, with each claim standing on its own as a separate embodiment.

What is claimed is:

1. A computer-implemented system comprising:
a job scheduler implemented by one or more processors and configured to:
receive an activity notification from a cloud service that stores data on behalf of an enterprise, the activity notification including one or more data fields specifying at least a file name of a file and an activity performed on the file by the cloud service;
verify the one or more data fields of the activity notification, the verifying the one or more data fields of the activity notification includes:
determining that a data field among the one or more data fields includes an invalid value;
determining an expected value of the data field that includes the invalid value, in response to the determining that the data field includes the invalid value; and
communicating an error message to the cloud service that includes an indication of the invalid value and the expected value of the data field;
a backend server implemented by one or more processors and configured to:
download the file from the cloud service using the file name specified by the activity notification and an enterprise user identifier; and
a data loss prevention engine, implemented by one or more processors, the data loss prevention engine is separate from the cloud service, and configured to:
analyze the downloaded file against a data loss prevention rule, the data loss prevention rule specifying conditions that violate a data loss prevention policy of the enterprise;
the backend server is further configured to, responsive to transmitting the downloaded file to the data loss prevention engine, delete a copy of the downloaded file from the cloud service, and responsive to an outcome of an analysis of the downloaded file against the data loss prevention rule, communicate an action response to the cloud service directing the cloud service to perform an action on the file, the action being based on the outcome of the analysis;
the analysis by the one or more processors is performed independently of any logic residing on, or operations performed by, the cloud service; and
the data loss prevention engine further configured to generate a report that tracks and reports on the activity notification.

2. The computer-implemented system of claim 1, wherein the activity notification further specifies at least one of: cloud service identifier, enterprise user identifier, file path, or file activity.

3. The computer-implemented system of claim 1, wherein downloading the file from the cloud service further comprises sending a file request to the cloud service that includes the file name.

4. The computer-implemented system of claim 2, wherein downloading the file from the cloud service further comprises sending a file request to the cloud service based on selecting the cloud service using the cloud service identifier.

5. The computer-implemented system of claim 4, wherein the cloud service identifier is a uniform resource locator.

6. The computer-implemented system of claim 1, wherein the action response includes the file name specified by the activity notification.

7. The computer-implemented system of claim 1, wherein the data loss prevention rule determines whether the file includes data representing a social security number.

8. The computer-implemented system of claim 1, wherein the data loss prevention rule determines whether the file includes data representing financial data.

9. A computer-implemented method comprising:
receiving an activity notification from a cloud service that stores data on behalf of an enterprise, the activity notification including one or more data fields specifying at least a file name of a file and an activity performed on the file by the cloud service;
verifying the one or more data fields of the activity notification, the verifying the one or more data fields of the activity notification includes:
determining that a data field among the one or more data fields includes an invalid value;
determining an expected value of the data field that includes the invalid value, in response to the determining that the data field includes the invalid value; and
communicating an error message to the cloud service that includes an indication of the invalid value and the expected value of the data field;
downloading the file from the cloud service using the file name specified by the activity notification;
responsive to downloading the file from the cloud service, transmitting a request to delete a copy of the downloaded file from the cloud service;
analyzing, by one or more processors, the downloaded file against a data prevention loss rule, the data loss prevention rule specifying conditions that violate a data loss prevention policy of the enterprise, and the analysis by the one or more processors is performed independently of any logic residing on, or operations performed by, the cloud service;
responsive to an outcome of the analyzing of the downloaded file against the data loss prevention rule, communicating an action response to the cloud service, the action response directing the cloud service to perform an action on the file based on the outcome of the analyzing; and
generating a report on the activity notification over a time period.

10. The computer-implemented method of claim 9, wherein the activity notification further specifies at least one of: cloud service identifier, enterprise user identifier, file path, or file activity.

11. The computer-implemented method of claim 9, wherein downloading the file from the cloud service further comprises sending a file request to the cloud service that includes the file name and enterprise user identifier.

12. The computer-implemented method of claim 10, wherein downloading the file from the cloud service further comprises sending a file request to the cloud service based on selecting the cloud service using the cloud service identifier.

13. The computer-implemented method of claim 12, wherein the cloud service identifier is a uniform resource locator.

14. The computer-implemented method of claim 9, wherein the action response includes the file name specified by the activity notification.

15. The computer-implemented method of claim 9, wherein the downloading is performed by a backend server, and the analyzing the file against the data loss prevention rule is performed by a data loss prevention engine, and the method of claim 9 further comprises:
sending, by the backend server, the downloaded file to the data loss prevention engine; and
deleting, by the backend server, the downloaded file after the downloaded file is sent to the data loss prevention engine.

16. The computer-implemented method of claim 9, wherein the data loss prevention rule determines whether the file includes data representing confidential data, the data loss prevention rule including criteria that determines whether data is confidential, the criteria being defined by the enterprise.

17. A non-transitory computer-readable medium storing executable instructions thereon, which, when executed by a processor, cause the processor to perform operations comprising:
receiving an activity notification from a cloud service that stores data on behalf of an enterprise, the activity notification including one or more data fields specifying at least a file name of a file and an activity performed on the file by the cloud service;
verifying the one or more data fields of the activity notification, the verifying the one or more data fields of the activity notification includes:
determining that a data field among the one or more data fields includes an invalid value;
determining an expected value of the data field that includes the invalid value, in response to the determining that the data field includes the invalid value; and
communicating an error message to the cloud service that includes an indication of the invalid value and the expected value of the data field;
downloading the file from the cloud service using the file name specified by the activity notification;
responsive to downloading the file from the cloud service, transmitting a request to delete the file from the cloud service;
analyzing the downloaded file against a data loss prevention rule, the data loss prevention rile specifying conditions that violate a data loss prevention policy of the enterprise, and the analysis is performed independently of any logic residing on, or operations performed by, the cloud based service;
responsive to an outcome of the analyzing of the downloaded file against the data loss prevention rule, communicating an action response to the cloud service, the action response directing the cloud service to perform an action on the file, the action being based on the outcome of the analyzing; and
generating a report on the activity notification.

* * * * *